United States Patent [19]
Yahata

[11] Patent Number: 4,564,940
[45] Date of Patent: Jan. 14, 1986

[54] BROAD BAND NETWORK SYSTEM

[75] Inventor: Haruki Yahata, Fujisawa, Japan

[73] Assignee: Tokyo Shibaura Denki Kabushiki Kaisha, Kawasaki, Japan

[21] Appl. No.: 564,179

[22] Filed: Dec. 22, 1983

[30] Foreign Application Priority Data

Dec. 28, 1982 [JP] Japan .................. 57-227401

[51] Int. Cl.$^4$ ................ H04Q 11/04; H04J 7/02
[52] U.S. Cl. ........................ 370/124; 370/57; 370/67; 370/73; 370/110.1
[58] Field of Search .......... 370/124, 57, 67, 85, 370/87, 73, 110.1

[56] References Cited

U.S. PATENT DOCUMENTS

| | | | |
|---|---|---|---|
| 3,701,851 | 10/1972 | Starrett | 370/57 |
| 3,860,873 | 1/1975 | Rigstad | 370/124 |
| 4,127,820 | 11/1978 | Beelitz et al. | 370/57 |
| 4,288,868 | 9/1981 | Grotjohann et al. | 370/110.1 |
| 4,425,642 | 1/1984 | Moses et al. | 370/76 |
| 4,446,564 | 5/1984 | Pierce | 370/124 |
| 4,479,213 | 10/1984 | Galand et al. | 370/110.1 |

OTHER PUBLICATIONS

New "Switchless" PABX Uses Coax, FDM to Offer Voice, Video, Data, Control; Stout et al., Mar. 1978.

Primary Examiner—Douglas W. Olms
Assistant Examiner—Curtis Kuntz
Attorney, Agent, or Firm—Oblon, Fisher, Spivak, McClelland & Maier

[57] ABSTRACT

A signal multiplex transmission system has predetermined work stations included in a plurality of terminal units which respectively process data in predetermined forms, and a private branch exchange or PBX. A transmission line is connected between the predetermined work stations and the PBX to commonly transmit frequency-multiplexed data from the PBX to the predetermined work stations. A separation filter separates first multiplexed signals supplied from the predetermined work stations from second multiplexed signals from other work stations and supplies the separated first multiplexed signals to the PBX independently of the second multiplexed signals, which signals are amplified by an amplifier. A mixer is connected to the PBX, the amplifier and a reception line. The first and second multiplexed signals are mixed by the mixer, and composite data is sent onto the reception line. The signal lines are used to transmit the multiplexed signals having the same frequency band.

25 Claims, 17 Drawing Figures

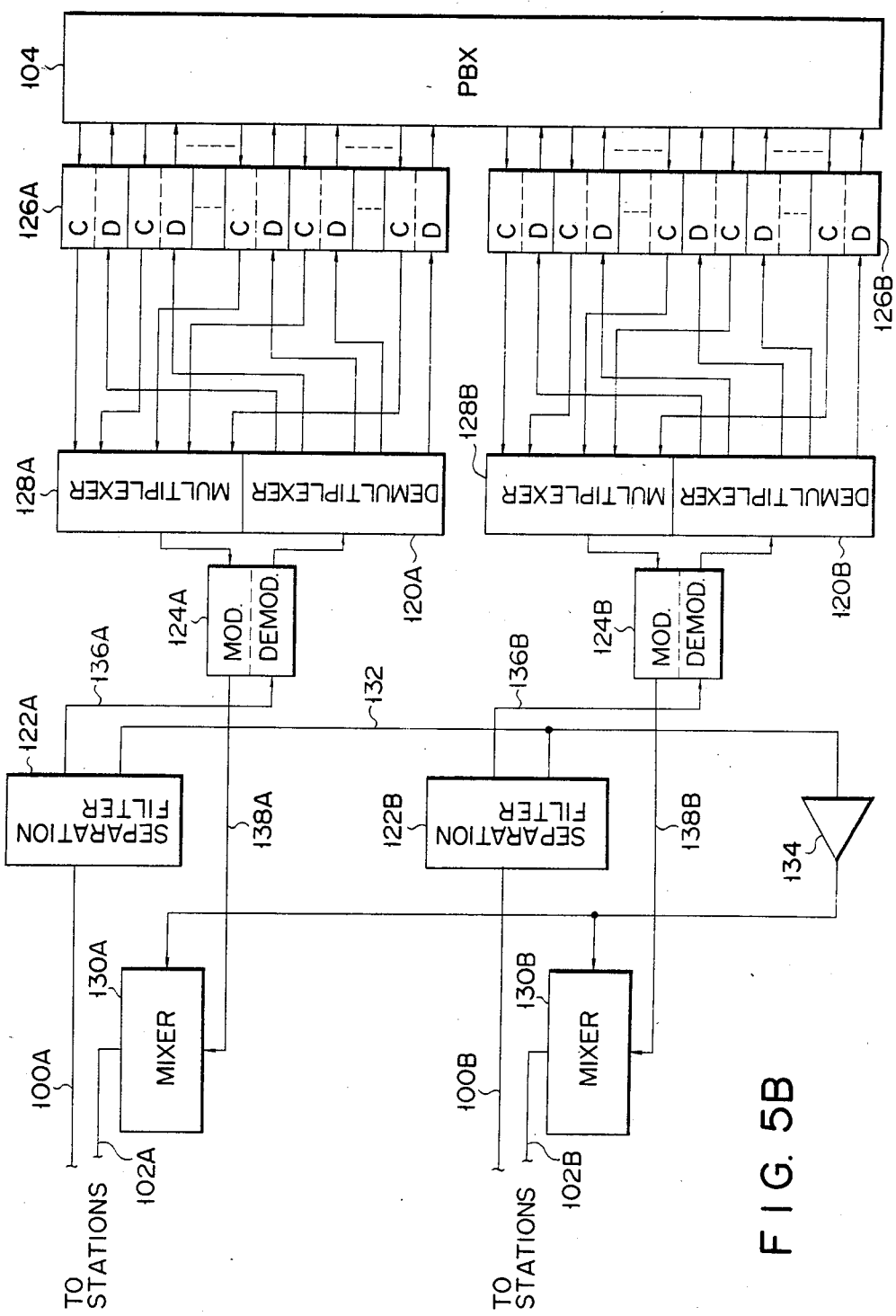
F I G. 5B

BROAD BAND NETWORK SYSTEM

BACKGROUND OF THE INVENTION

The present invention relates in general to an information multiplex transmission system for facilitating information transmission between terminal units or work stations and, in more particular, to a broad band network system for causing two arbitrary terminal units among the terminal units to transmit various data signal such as speech data, coded computer data and video data therebetween.

Utilization of various work stations such as business-use personal computers, facsimile (FAX) units, telephone signal units and the like in offices is increasing to improve office efficiency. Along with this tendency, the data signal transfer system for causing the terminals or work stations to transmit signals therebetween has become increasingly important to the effective exchange of signals between work stations.

Different work stations generate signals in different forms. For example, telephones exchange speech data in accordance with analog speech signals. However, personal computers as terminal units process coded digital data. Signals such as computer digital signals having a different form from that of analog speech signals cannot be transmitted per se onto telephone lines on which analog signals are transmitted. Therefore, conventionally, special signal transfer lines are added to transmit signals having a special form. Recently, a so-called "broad band network system" has been proposed wherein a broad band signal transmission network such as a coaxial cable or optical fiber cable is commonly installed between different types of work stations, and the frequency bandwidth of the network is divided into frequency ranges each of which is alotted to the transmission of data signals in a specific form. However, at present, in order to perform data communication between two arbitrary work stations among a number of work stations, a wide frequency band having a predetermined level or higher is required as a band for guaranteeing transmission of a signal having a specific form. Therefore, the signal transmission efficiency of the broad band network system is degraded, and the number of stations which may be connected to a single broad band network system is limited.

SUMMARY OF THE INVENTION

It is, therefore, an object of the present invention to provide a new and improved broad band network system in which some terminal equipment items can be arbitrarily selected from terminal equipment connected to the network system and can be subjected to effective communication therebetween.

In order to achieve the above object of the present invention, there is provided a signal multiplex transmission system comprising: a plurality of terminal units including predetermined terminal units for processing data having predetermined forms; and a branch exchange device for properly exchanging lines for allowing data communication between the predetermined terminal units. A signal separation device is provided for separating a first multiplexed signal from the predetermined terminal units from a second multiplexed signal from other terminal units and for transmitting the first multiplexed signal to said branch exchange device and separately producing the second multiplexed signal. A mixer device is connected to the branch exchange device and the signal separation device. The mixer device receives the first multiplexed signal from the predetermined terminal units through the branch exchange device and the second multiplexed signal from said signal separation device, and mixes the first and second multiplexed signals to supply a composite signal to the terminal units.

BRIEF DESCRIPTION OF THE DRAWINGS

The present invention is best understood with reference to the accompanying drawings, in which:

FIGS. 5A and 5B respectively are block diagrams illustrating the overall configuration of a broad band network system of a time division multiplex data transmission technique, according to a third embodiment of the present invention;

DETAILED DESCRIPTION OF THE PREFERRED EMBODIMENTS

Figure 1:
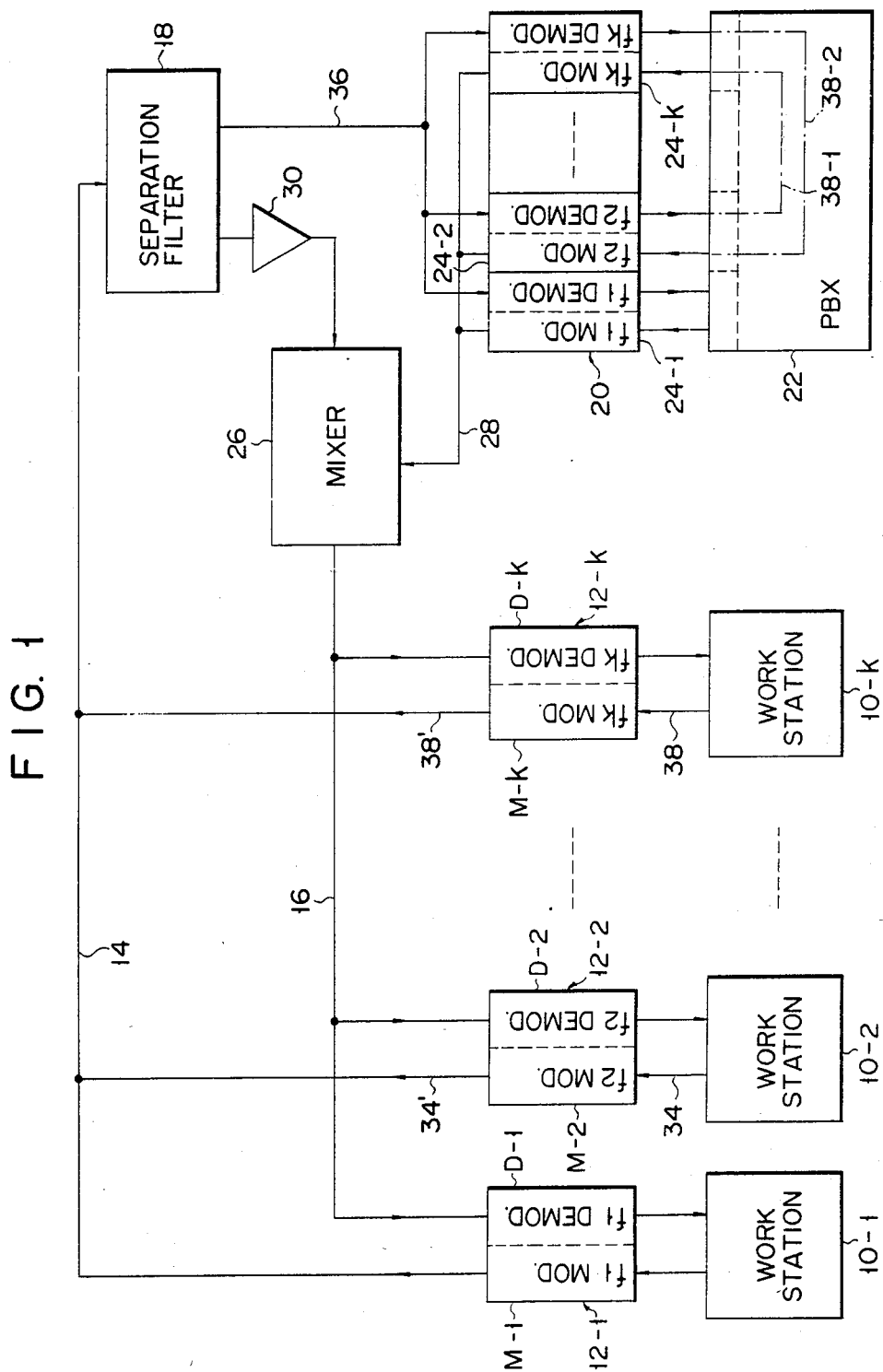
FIG. 1 is a block diagram illustrating the overall configuration of a broad band network system of a frequency-multiplexed signal transfer technique, according to a first embodiment of the present invention.
Figure 2:
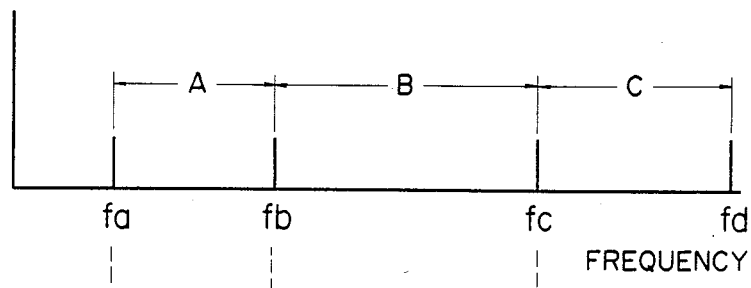
FIG. 2 is a frequency spectrum graph showing divided bands of the transmission frequency on the communication lines of the frequency multiplex signal transmission system of FIG. 1.

FIG. 1 illustrates a broad band network system in accordance with a first embodiment of the present invention. A plurality of different kinds of terminal units or work stations 10-1, 10-2, ..., and 10-$k$ such as business personal computers, facsimile (FAX) units, telephone signal units and the like, are connected to or associated with the network system. The line switching or communication work stations 10-1, 10-2, ..., and 10-$n$ are connected to first and second signal lines 14 and 16 respectively through modulator-demodulators (referred to as "modems" hereinafter) 12-1, 12-2, ..., and 12-$k$. The first line 14 serves as a signal transmission line, while the second one 16 functions as a signal reception line. Various types of information which are generated from and supplied to the different kinds of work stations 10 are frequency-divided and are transmitted on the first and second lines 14 and 16 in the first embodiment. The transmission frequency band of the lines is defined to fall within the range of fa to fd in FIG. 2. A band A is defined by the frequencies fa and fb. Similarly, bands B and C are respectively defined by the frequencies fb and fc and the frequencies fc and fd. The frequency band B is used as signal line communication.

The frequency band A is used as, for example, data packet transmission in accordance with the CSMA/CD (carrier-sense multiple-access/collision detection) technique, while the frequency band C is used as wire-link video information transmission.

Each modem 12 includes a modulator section M and a demodulator section D. Each modem 12 has a preselected modulation/demodulation frequency (modem frequency), which is different from that of other modems. The modem frequencies of the modems 12-1, 12-2, ..., and 12-$k$ are assigned the frequencies f1, f2, ..., and fk. The modem frequencies f1, f2, ..., and fk are included in the frequency band B. A modem (station modem) 12-1 of the first work station 10-1 frequency-modulates the data signal generated from the station 10-1 by using the frequency f1, and frequency-demodulates the data signal received from any other station through the line 16 by using the same frequency f1. The modulating and demodulating frequencies are the same as the frequency f1. A modem 12-2 of the second station 10-2 frequency-modulates/demodulates the data signals generated from and supplied thereto by using the frequency f2. Any other modem is operated in the same manner as the modems 12-1 and 12-2. The data signals generated from the modems 12-1, 12-2, ..., 12-$k$ are frequency-multiplexed and are transmitted onto the signal line 14. Therefore, the modems 12 serve as multiplexer/demultiplexers.

The line 14 of the broad band network system is connected through a separation filter 18 to a modem assembly 20 dedicated for a private branch exchange section (to be referred to as "PBX" hereinafter) 22. This separation filter 18 separates a signal component which is included in the frequency multiplexed signal supplied thereto and which has the frequency band B from the signal components having the frequency band A or C. The modem assembly 20 has private branch exchange modems (PBX modems) 24-1, 24-2, ..., and 24-$k$ respectively corresponding to the station modems 12-1, 12-2, ..., and 12-$k$ so as to perform frequency modulation/demodulation of the communication signals generated from the PBX 22 to the modem assembly 20 and supplied from the modem assembly 20 to the PBX 22. The communication signals (having frequencies falling within the frequency band B) which are respectively generated from the work stations 10-1, 10-2, ..., and 10-$k$, which are respectively modulated (frequency-multiplexed) by the station modems 12-1, 12-2, ..., and 12-$k$ and which are transmitted on the data line 14 are extracted by the separation filter 18 at once. These extracted signals are supplied to the modem assembly 20. The line switching signals frequency-modulated by the PBX 22 through predetermined signal lines therein are generated therefrom. The signals from the PBX 22 are supplied to the modem assembly 20 again. More specifically, the output signals from the PBX 22 are supplied to demodulator portions of the PBX modems 24 built into the modem assembly 20. The signals demodulated by the PBX modems 24 are supplied to the first input port of a mixer 26 through a signal line 28. The second input port of the mixer 26 is connected to the separation filter 18 through a signal amplifier 30. All signal components of the frequency band A or C which are derived from the frequency-multiplexed data signals supplied to the separation filter 18 and are separated by the separation filter 18 from the signal component of the band B are supplied to the mixer 26 through the amplifier 30. The mixer 26 mixes the B-band signals supplied from the modem assembly 20 and the A- and C-band signals amplified by the amplfier 30. The composite frequency-multiplexed signals are transmitted to the work stations through the signal reception line 16.

Figure 3A:
FIGS. 3A to 3I are respectively frequency spectrum diagrams showing the signals generated from the main part of the signal transmission system shown in FIG. 1.
Figure 3B:
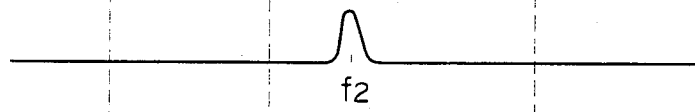
Figure 3C:
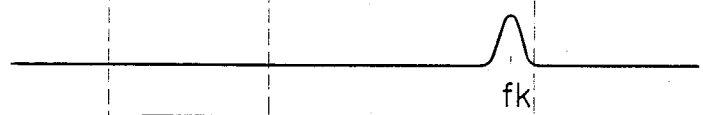
Figure 3D:
Figure 3E:

In the broad band network system thus configurated according to the first embodiment of the present invention, data signal separation and mixing are performed in the following manner. The waveforms of the signals shown in FIG. 3A to 3I are illustrated as a function of the signal frequency band of the graph shown in FIG. 2. FIGS. 3A to 3C show frequency spectra of the signals respectively modulated by the station modems 12-1, 12-2, ..., and 12-$k$ at different modulation frequencies f1, f2, ..., fk (included in the frequency band B) and transmitted on the line 16. FIGS. 3D and 3E respectively illustrate frequency spectra of the information signals having the band A or C (e.g., image information from image file units or video units (not shown)). The multiplexed data signal obtained by frequency-multiplexing the signals of FIGS. 3A to 3E and transmitted through the line 14 has a frequency spectrum shown in FIG. 3I. The separation filter 18 separates the B-band signal component from the A- and C-band signal components in accordance with the frequency band filtering characteristics shown in FIGS. 3F and 3G. Therefore, the modem assembly 20 for the PBX 22 receives the communication signals which are modulated by the carrier frequencies f1, f2, ..., and fk included in the frequency band B.

The demodulator sections of the plurality of modems 24-1, 24-2, ..., and 24-$k$ in the modem assembly 20 demodulate the corresponding data signals and supplies the demodulated signals to the PBX 22. The communication signal from the station modem 12-2 is demodulated by the PBX modem 24-2 and the demodulated signal is supplied to the PBX 22. The PBX changes the signal lines so that the communication signal is supplied to a suitable modem (24-1, ..., or 24-$k$) having a frequency corresponding to a carrier frequency (f1, ..., or fk) of a specific work station to which the communication signal is to be supplied. The B-band output signal from the modem assembly 20 is mixed by the mixer 26 with the A- and C-band output signals supplied from the separation filter 18 through the amplifier 30. The composite communication signal generated from the mixer 26 has the frequency spectrum shown in FIG. 3I and is transmitted onto the line 16. It should be noted that, though the frequency spectrum of the signal supplied onto the line 14 is the same as that of the signal supplied on the line 16, the B-band communication signal modulated with the carrier frequency f1, f2, ..., or fk differs between the lines 14 and 16 in practice. The B-band data signal modulated with the carrier frequency f1, f2, ..., or fk is demodulated by the corresponding station modem 12-1, 12-2, ..., or 12-$k$, and then is reproduced by a suitable work station 10-1, 10-2, ..., or 10-$k$.

In the broad band network system thus configurated according to the first embodiment of the present invention, data communication between two arbitrarily selected work stations is performed as follows. Assume that the two work stations 10-2 and 10-$k$ are connected to each other through the PBX 22 in order to perform data communication therebetween. A data signal 34 transmitted from the work station 10-2 to the work station 10-$k$ is modulated with the frequency f2 by the station modem 12-2. The carrier frequency f2 of a demodulated signal 34' falls within the B-band frequency. A modulated data signal 34' is supplied to the separation filter 18 through the signal line 14. The B-band modulated data signal is separated by the separation filter 18 from the A- and C-band modulated data signals. The B-band data signal is transmitted to the modem assembly 20 through a line 36. This signal is demodulated by the f2-demodulator portion of the PBX modem 24-2, and the demodulated signal is then supplied as the communication signal to the PBX 22. The PBX 22 determines its output ports to be used and changes the internal signal paths thereof, as indicated by reference numerals 38-1 and 38-2, in accordance with connection demand for connecting the work station 10-2 to the station 10-k. Therefore, the output signal from the PBX modem 24-2 is supplied to the fk-modulator portion of the PBX modem 24-k through the internal signal path 38-1 of the PBX 22. The signal is modulated with the carrier frequency fk in response to the signal from the signal supplied from the work station 10-2 to the PBX modem 24-k to generate a fk-frequency modulated signal, which is supplied to the station modem 12-k through the mixer 26. The signal is then demodulated with the frequency fk by the station modem 12-k, and a demodulated signal is supplied to the target work station 10-k.

On the other hand, data transmission from the work station 10-k to the work station 10-2 is performed as follows. A data signal 38 from the work station 10-k is modulated with the frequency fk by the station modem 12-k, and is supplied as a B-band modulated signal 38' to the PBX modem 24-k through the separation filter 18. This signal is demodulated by the fk-demodulator portion of the modem 24-k and is supplied to the PBX modem 24-2 through the internal signal path 38-2 of the PBX 22. The output signal from the PBX 22 is used to modulate the signal having the carrier frequency f2 so as to produce a demodulated signal, which is supplied to the data line 16 through the mixer 26. The modulated signal is demodulated by the station modem 12-2 and is then reproduced at the target work station 10-2.

In the broad band network system according to the first embodiment of the present invention which has the configuration and operates in the manner as described above, the multiplexed communication signal transmitted through the data line is divided by the separation filter into the predetermined bands, and the predetermined band signal is transmitted and then multiplexed with signals of the other band. The multiplexed signal thus obtained is received by the receiving-side work station. Therefore, the signal transmission line 14 is isolated from the signal reception line 16 with respect to the frequency bands which are assigned for data communication among the work stations 10-1, 10-2, ..., and 10-k associated with the network system. The frequency band set for one signal line is not restricted by that for the other signal line and can be performed independently thereof. As a result, the modulated signal having the same channel (frequency slot) can be transmitted between two common signal lines, i.e., the lines 14 and 16. In this case, assume that data communication between the work stations 10-2 and 10-k is performed in the same manner as described above. The modulated signals which can be transmitted through the line 14 have the carrier frequencies f2 and fk, respectively. Similarly, the signals having the carrier frequencies f2 and fk can be transmitted through the line 16. According to the present invention, different frequency bands need not be set for the signal lines 14 and 16. If the number of associated work stations is predetermined, the number of channels can be reduced to half. In other words, if the number of channels is predetermined, the number of work stations associated with the network system can be doubled.

Figure 4:
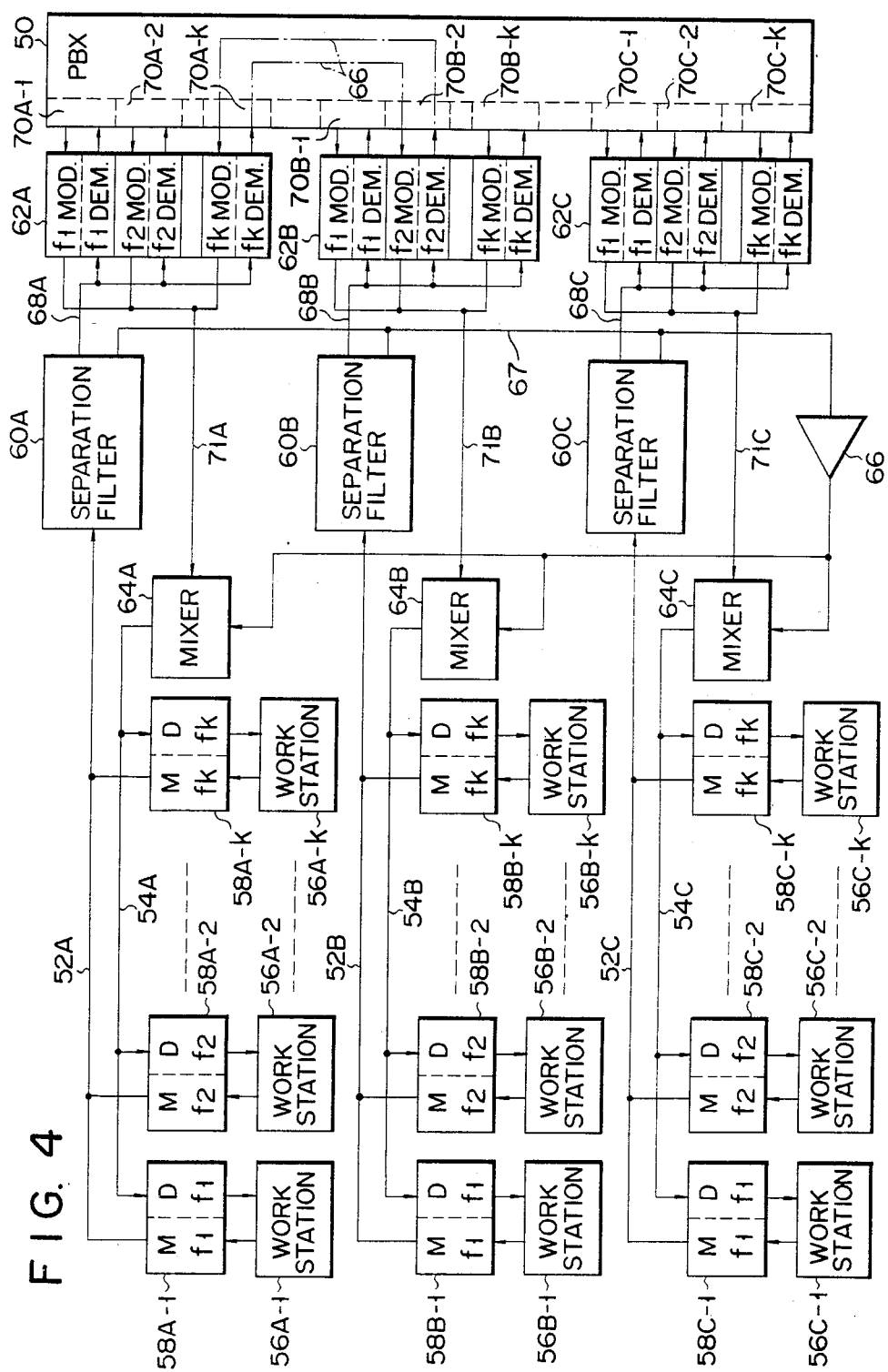
FIG. 4 is a block diagram illustrating the overall configuration of a broad band network system of a frequency multiplex signal transfer technique, according to a second embodiment of the present invention.

FIG. 4 shows the network system according to a second embodiment of the present invention. In this embodiment, three pairs of signal lines 52A and 54A, 52B and 54B, and 52C and 54C are arranged for a single private branch change or PBX 50. The first pair of signal lines 52A and 54A are associated with work stations 56A-1, 56A-2, ..., 56A-k and station modems 58A-1, 58A-2, ..., 58A-k. Similarly, the second pair of signal lines 52B and 54B are associated with work stations 56B-1, 56B-2, ..., 56B-k and station modems 58B-1, 58B-2, ..., 58B-k; and the third pair of signal lines 52C and 54C are associated with work stations 56C-1, 56C-2, ..., 56C-k and station modems 58C-1, 58C-2, ..., 58C-k.

The three signal lines 52A, 52B and 52C are connected through first outputs of separation filters 60A, 60B and 60C to three PBX modem modules 62A, 62B and 62C, respectively, which PBX modem modules are connected to the single PBX 50. Each PBX modem module 62 has the same construction as that of the aforementioned modem assembly 20 presented in FIG. 1. Three sets of modulator portions of the PBX modems included in the modules 62A, 62B and 62C are connected to the signal lines 54A, 54B and 54C through three mixers 64A, 64B and 64C, respectively. Second outputs of the filters 60A, 60B and 60C are connected to a signal amplifier 66 through a common line 67. An output signal from this amplifier 66 is supplied to the three mixers 64A, 64B and 64C.

Modulation/demodulation (modem) carrier frequencies f1, f2, ..., and fk are respectively assigned to the station modems 58A-1, 58A-2, ..., and 58A-k which are arranged in the work stations 56A-1, 56A-2, ..., and 56A-k and which are associated with the first pair of signal lines 52A and 54A, respectively. Similarly, modulation/demodulation (modem) carrier frequencies f1, f2, ..., and fk are respectively assigned to the station modems 58B-1, 58B-2, ..., and 58B-k which are arranged in the work stations 56B-1, 56B-2, ..., and 56B-k and which are associated with the second pair of signal lines 52B and 54B, respectively. In the same manner, modulation/demodulation (modem) carrier frequencies f1, f2, ..., and fk are respectively assigned to the station modems 58C-1, 58C-2, ..., and 58C-k which are arranged in the work stations 56C-1, 56C-2, ..., and 56C-k and which are associated with the third pair of data lines 52C and 54C, respectively. In other words, the same carrier frequency f1 is assigned to the station modems 58A-1, 58B-1 and 58C-1; the same carrier frequency f2 is assigned to the station modems 58A-2, 58B-2 and 58C-2; and the same carrier frequency fk is assigned to the station modems 58A-k, 58B-k and 58C-k.

The PBX 50 performs line switching to allow data communication between any two (e.g., stations 56A-k and 56B-2 in FIG. 4) of all the work stations 56A-1, 56A-2, ..., and 56A-k, 56B-1, 56B-2, ..., and 56B-k, and 56C-1, 56C-2, ..., and 56C-k which are respectively connected to the first to third pairs of signal lines 52A and 54A, 52B and 54B, and 52C and 54C, respectively. According to the internal switching state of the PBX 50 which is indicated by reference numeral 60, any one of the work stations 56A associated with the first pair of signal lines 52A and 54A can communicate with any one of the work stations 56B associated with the second pair of signal lines 52B and 54B.

Signal lines 68A, 68B and 68C respectively connected to the first output terminals of the separation filters 60A, 60B and 60C are connected to the modulator sides of the PBX modem modules 62A, 62B and 62C. Each PBX modem module 62 has k modulator portions to which the carrier frequencies f1, f2, . . . , and fk are respectively assigned. The modulator output terminals of the PBX modem modules 62A, 62B and 62C are connected to PBX terminals 70A-1, 70A-2, . . . , and 70A-k, PBX terminals 70B-1, 70B-2, . . . , and 70B-k, and PBX terminals 70C-1, 70C-2, . . . , and 70C-k, respectively. Therefore, the modulated signals from the PBX modem modules 62A, 62B and 62C are supplied to the mixers 64A, 64B and 64C through lines 71A, 71B and 71C, respectively. The modulated signals are mixed by the mixers 64A, 64B and 64C with signals which have other frequency bands (A and C bands) and which are supplied to the mixers 64A, 64B and 64C through the common line 67 and the amplifier 66. Output signals from the mixers 64A, 64B and 64C are supplied to the lines 54A, 54B and 54C. The operation of each component corresponding to the system of FIG. 1 is substantially the same as that of the system of FIG. 1, and a detailed description will be omitted.

In the broad band network system configured as described above according to the second embodiment, the three signal transmission lines are independent of the three signal reception lines with respect to the communication band signals, so that the signal having the identical channel (frequency slot) can be transmitted. When the band B of the second embodiment is the same as that of the first embodiment, the terminal devices corresponding to the same number of terminals can be connected between each pair of transmission and reception lines. Therefore, according to the second embodiment, the number of terminal units associated with the system is tripled. If the number of terminal units required in the second embodiment can be the same as that of terminal devices required in the first embodiment, the bandwidth of band B can be substantially reduced to $\frac{1}{3}$.

In the above embodiments, frequency multiplexing is used as the modulation scheme so as to transmit the data between the transmission and reception lines. However, the present invention can be applied to transmit a communication signal in accordance with time division multiplexing.

Figure 5A:
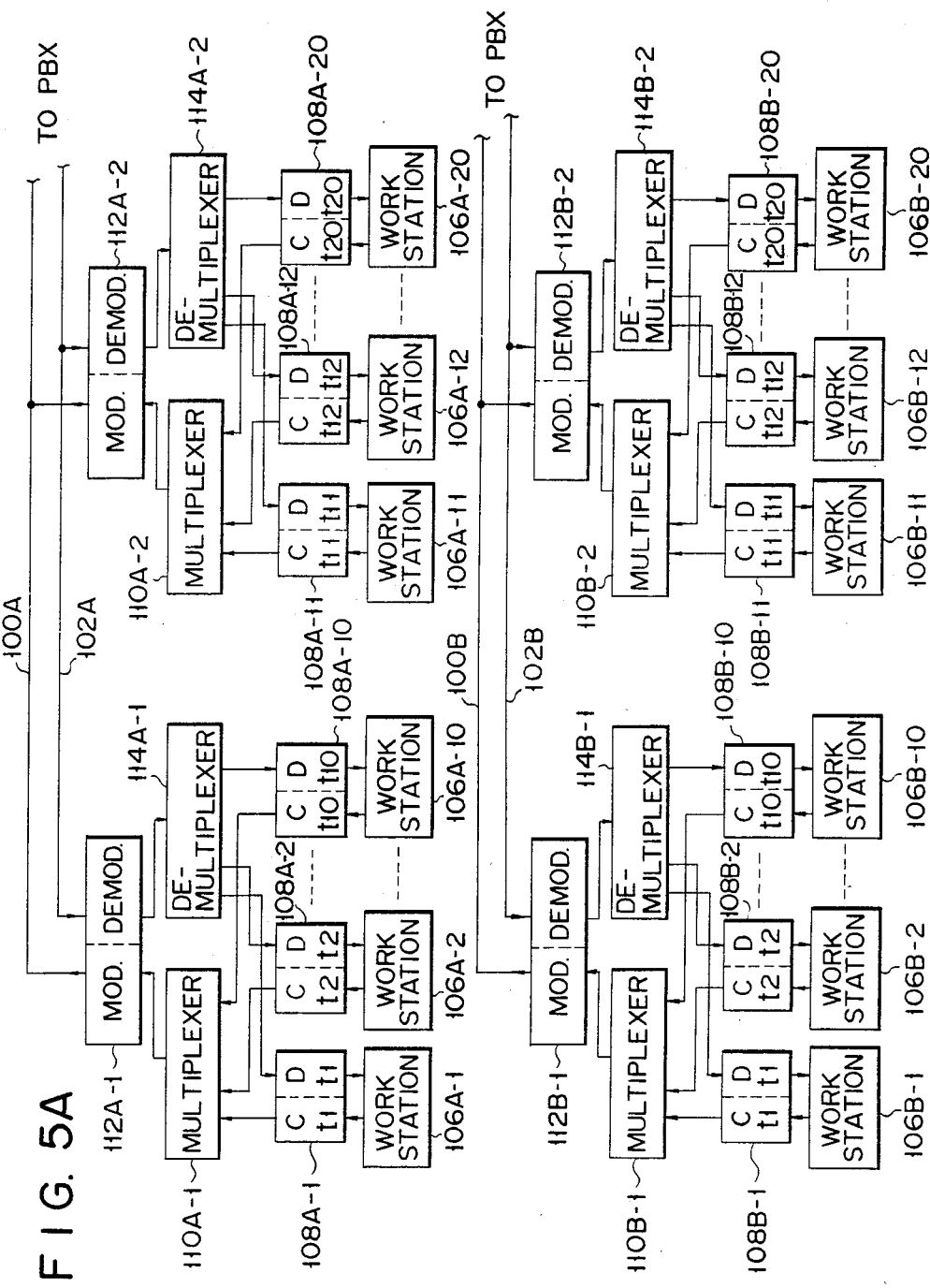

A broad band network system of a third embodiment of the present invention which performs signal transmission in accordance with time division multiplexing is illustrated in FIGS. 5A and 5B for illustrative convenience.

Referring to FIG. 5A, a first pair of data lines 100A and 102A and a second pair of data lines 100B and 102B are connected to a private branch change (PBX) 104 which is separately illustrated in FIG. 5B for illustrative convenience. A detailed description of the connection between the data lines and the PBX will be made later on. The peripheral arrangement of the work stations will be first described with reference to FIG. 5A.

Work stations 106A-1, 106A-2, . . . , and 106A-1 (for 1=10 to prevent complexity of numbering) are connected to coder-decoders (known as "codecs" to those skilled in the art) 108A-1, 108A-2, . . . , and 108A-10, respectively. Output terminals of the coder portions of the codecs 108A are connected to the first data transmission line 100A through a multiplexer 110A-1 and the modulator portion of a modem 112A-1. The decoder portions of the codecs 108A-1, . . . , and 108A-10 are connected to the first data reception line 102A through the demodulator portion of the modem 112A-1. The codecs 108A sample the speech signals supplied from a terminal device such as a telephone at a predetermined time slot ti to produce a pulse coded modulation (PCM) signal which is transmitted to the multiplexer 112A. Unlike the telephone terminal, digital signal of logic "1" or "0" is extracted by a data terminal unit, a buffer is used in place of a codec so as to temporarily store the digital data in units of time slots ti and to supply the unit data to the multiplexer. A demultiplexer 114A-1 demultiplexes a series of signals supplied from the codecs 108A and generates a single time series signal which is supplied to the decoder portions of the codecs 108A-1, . . . and 108A-10. The multiplexer 110A-1 and the demultiplexer 114A-1 constitute a signal multiplexer/demultiplexer. The output terminal of the multiplexer 110A-1 is connected to the modulator portion of the modem 112A-1, so that the time series signal from the multiplexer is sent as the B-band signal onto the data transmission line 100A.

Other work stations 106A-11, 106A-12, . . . , and 106A-20 associated with the data transmission lines 100A and 102A are connected to the lines 100A and 102A through codecs 108A-11, 108A-12, . . . , and 108A-20, a multiplexer 110A-2, a demultiplexer 114A-2 and a modem 112A-2. Work stations 106B-1, 106B-2, . . . , and 106B-10, work stations 106B-11, 106B-12, . . . , and 106B-20, codecs 108B-1, 108B-2, . . . , 108B-10, 108B-11, . . . , and 108B-20, multiplexers 110B-1 and 110B-2, demultiplexers 114B-1 and 114B-2, and modems 112B-1 and 112B-2 are properly connected to second data lines 100B and 102B in the same manner as described above. It should be noted that, in FIG. 5A, other terminal devices except for the stations associated with the system are omitted.

The data transmission line 100A shown in FIG. 5A is connected to a demultiplexer 120A through a first output of a first separation filter 122A, and the demodulator portion of a modem 124A. Output terminals of the demultiplexer 120A are connected to the PBX 104 through a first codec section 126A having a plurality of codecs (respectively corresponding to the work stations associated with the data lines 100A and 102A). Coder outputs of the first codec section 126A are connected to the first reception line 102A through a multiplexer 128A, the modulation portion of the modem 124A, and a mixer 130A. A second separation filter 122B, a modem 124B, a multiplexer 128B, a demultiplexer 120B, a second codec section 126B and a mixer 130B are provided between the PBX 104 and the second transmission and reception lines 100B and 102B in the same manner as described above. Second outputs of the separation filters 122A and 122B are connected through a common signal line 132 to a signal amplifier 134 which has its output connected to the mixers 130A and 130B.

Figure 6:
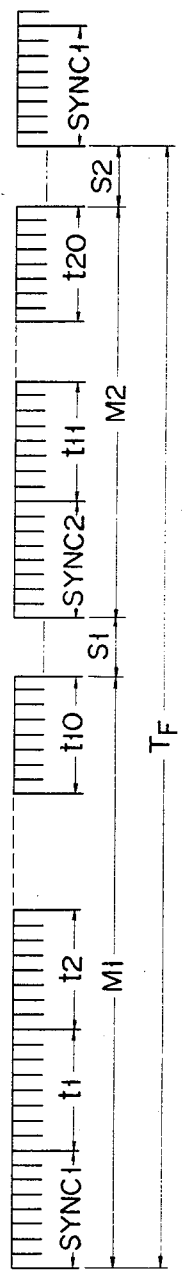
FIG. 6 is a graph showing the setting state of time slots (channels) associated with the time division multiplexing on the communication line of the time division multiplex data transmission system of FIGS. 5A and 5B.

An example of the time slots of the transmission and reception lines is shown in FIG. 6 as a function of time. Reference symbol $T_F$ denotes one frame period. Each time slot (channel) comprises 8 bits in this embodiment. Refrence symbol M1 denotes an output from the modem 112A-1 or 112B-1; M2, an output from the modem 112A-2 or 112B-2; S1 and S2, spacer periods between the output signals M1 and M2; and SYNC1 and SYNC2, time slots for synchronization. The signal sources are the multiplexer 110A-1 or 110B-1 and the multiplexer 110A-2 or 110B-2.

The signals on the first and second transmission lines 100A and 100B are separated by the separation filters 122A and 122B into a B-band signal and A- and C-band signals, respectively. The B-band signal is supplied to the demodulator portions of the modems 124A and 124B through data lines 136A and 136B. The demodulated signals are divided by the demultiplexers 120A and 120B into time slots. The time slots are converted by the codec sections 126A and 126B to analog signals which are then supplied to the PBX 104.

The analog signals passing through the predetermined internal paths (not shown) of the PBX 104 are coded by the codecs 126A and 126B, and the coded signals are time-division multiplexed by the multiplexers 128A and 128B. The multiplexed signals are supplied to the modulator portions of the modems 124A and 124B. The modulated signals from the modulator portions of the modems 124A and 124B are supplied to the data lines 138A and 138B. It should be noted that the time slots of the signals on the data lines 138A and 138B are the same as those shown in FIG. 6, but that the frame format of the data lines 138A and 138B need not necessarily coincide with that of the lines 100A and 100B.

The A- and C-band signals separated by the separation filters 122A and 122B and passing through the common data line 132 are amplified by the amplifier 134 and are mixed by the mixers 130A and 130B with the signals transmitted through the lines 138A and 138B. The composite output signal is supplied to the lines 102A and 102B. The B-band signal on the lines 102A and 102B are demodulated by the modems 112A and 112B shown in FIG. 5A, thus obtaining baseband signals. These baseband signals are demultiplexed by the demultiplexers 114A and 114B to produce time slot signals which are supplied to the codecs 108A and 108B. Thereafter, these signals are converted by the codecs 108A and 108B and are then supplied to the work stations 106A and 106B. The circuit connection within the PBX 104 in FIG. 5B is the same as that shown in FIG. 4.

In the network system configured as described according to the third embodiment of the present invention, the identical time slots can be set on the two pairs of data transmission and reception lines branched from the PBX 104. Therefore, when the number of work stations or terminal devices is predetermined, the number of time slots can be decreased, and hence the bandwidth of band B can be narrowed. In other words, when the bandwidth of the band B is given, more work stations can be associated with the system.

Although the present invention has been shown and described with respect to particular embodiments, various changes and modifications which are obvious to a person skilled in the art to which the invention pertains are deemed to lie within the spirit and scope of the invention.

Figure 3F:
Figure 3G:
Figure 3H:
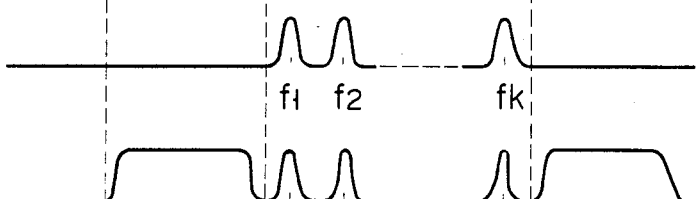
Figure 3I:
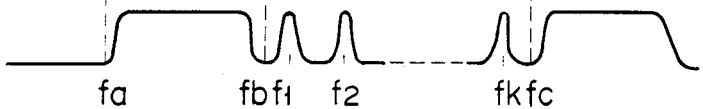

For example, in the embodiments shown in FIGS. 1 and 4, the separation filter having the filtration characteristics shown in FIGS. 3F and 3G is used. However, when a filter for filtrating only the component to be demodulated is connected to the input terminal of each demodulator portion of the PBX modem, the separation filter can be omitted.

Figure 7:
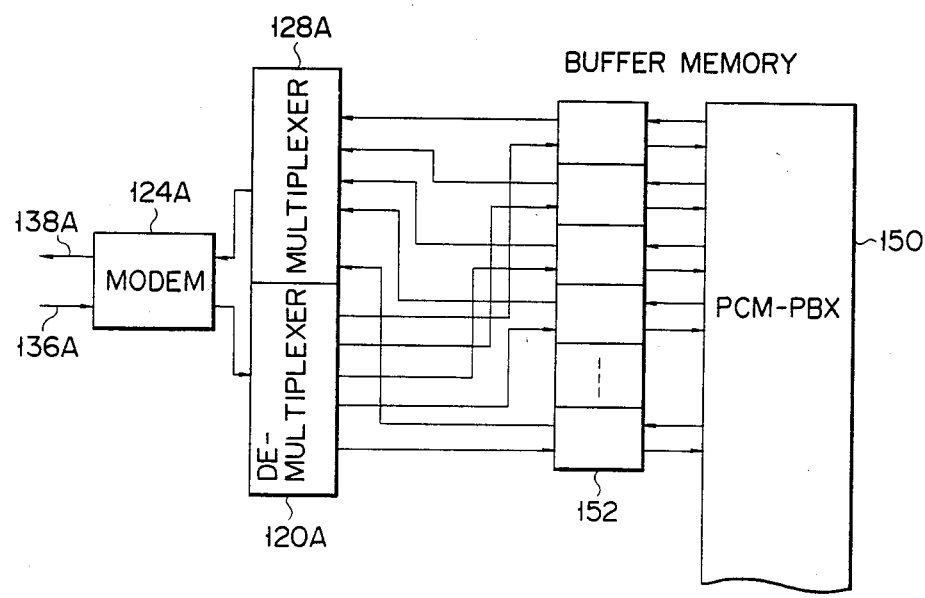
FIG. 7 is a block diagram showing part of a modification of the broad band network system of the third embodiment.

In the embodiment shown in FIGS. 5A and 5B, the PBX 104 may comprise a time or space division multiplex PBX. Furthermore, a PCM PBX having a codec section in its input/output circuit and frequently used these days can be used in the network system shown in FIG. 5. However, a construction loss occurs only when the PCM PBX is replaced with the PBX 104 shown in FIG. 5B. This is because the digital signal from the multiplexer 128 is converted by the codec section 126 to an analog signal which is then converted by the codec section of the PCM PBX to a digital signal again. When the signal is generated from the PCM PBX, an extra codec section is required. A network system including a PCM PBX and having a construction which improves the above drawback is illustrated in FIG. 7. In the network system shown in FIG. 7, the codec section built into a PCM PBX 150 is removed, and the digital signal can be directly processed.

The same reference numerals used in FIGS. 5A and 5B denote the same parts in FIG. 7. An analog signal supplied to a data line 136A is demodulated by a modem 124A to produce a digital baseband signal. This signal is demultiplexed by a demultiplexer 120A into time slot signals. These signals are supplied to a buffer memory 152. The buffer memory 152 is arranged to synchronize the digital signal from the demultiplexer 120A with the digital signal to the PCM PBX 150. The digital output signal from the PCM PBX 150 is also synchronized under the control of the buffer memory 152 and is supplied to a multiplexer 128A. The time-division multiplexed signal from the multiplexer 128A is modulated by the modem 124A, and a modulated signal is sent onto a line 136A. Any other arrangement of this system is the substantially the same as that of the system shown in FIGS. 5A and 5B. The arrangement around the PCM PBX of the network system shown in FIG. 7 can be simplified.

Figure 8:
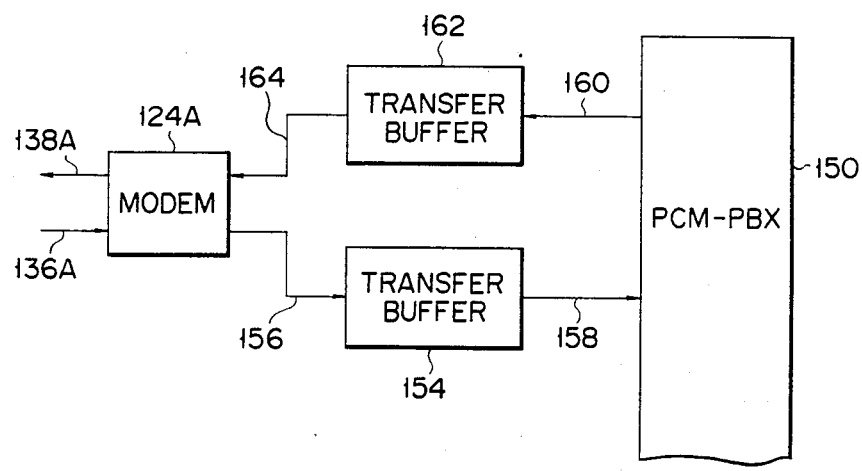
FIG. 8 is a block diagram showing part of another modification of the broad band system of the third embodiment.

FIG. 8 shows shows the main part of another modification of the third embodiment. In this network system, a time-division multiplexed signal can be transmitted with the internal bus of the PBX without performing multiplexing/demultiplexing. An analog signal supplied to a data line 136A is demodulated by a modem 124A to produce a digital baseband signal. This baseband signal is supplied to a transfer buffer 154 through a line 156. An output signal from the buffer 154 is supplied to a PCM PBX 150. The transfer buffer 154 is arranged to match the form of the signal on the line 156 with the form of the bus of the PCM PBX 150 and to synchronize the signal on the line 156 with the signal on the bus of the PCM PBX 150. A line 158 connected to the output terminal of the buffer 154 is directly connected to a receiving-end bus (not shown) in the PCM PBX 150. On the other hand, a signal from the sending-end bus of the PCM PBX 150 is supplied to a transfer buffer 108 through a line 160. The signal from the PCM PBX 150 is converted to have a form opposite to that of the transfer buffer 154 and is synchronized so as to match with the form of the signal on the line. The output signal from a transfer buffer 162 is supplied to the modem 124A through a line 164 and is demodulated. The demodulated signal is sent onto the line 138A.

In the description given above, the transmission line is provided to transmit signals and the reception line is used to receive signals. These lines may be replaced by one line, which has two signal bands so as to achieve a bidirectional signal transmission. The use of such a single line is advantageous since, if branch line sections are provided to connect the work stations, the same band may be used for these branch line sections. If one line is used, the mixers 64 of FIG. 4 and the amplifier 134 of FIG. 5B also function as a frequency converter. Let a modulation frequency of a signal supplied from the PBX to a given terminal i be denoted by fi. Then, a frequency fi' which falls within the range suitable for the reverse signal transmission will be used as the reverse modulation frequency. Time slots for the bidirectional signal transmission may be arranged in the same manner as shown in FIGS. 5A and 5B. The modulation frequencies the input and output signals of the PBX are set to fall within the different transmission bands, respectively.

What is claimed is:

1. A signal multiplex transmission system comprising:
   (a) plurality of terminal units including a plurality of first terminal units for processing information signals to generate first information signals which are multiplexed to be transmitted as first multiplexed information signals in a first frequency band and a plurality of second terminal units for processing information signals to generate second information signals which are multiplexed to be transmitted as second multiplexed information signals in a second frequency band;
   (b) branch exchange means for allowing signal transmission between said first terminal units;
   (c) signal separation means for receiving the first and second multiplexed information signals, for separating the first multiplexed information signals from the second multiplexed information signals, and for transmitting the first multiplexed information signals to said branch exchange means and outputting the second multiplexed information signals; and
   mixer means, connected to said branch exchange means and said signal separation means, for receiving the first multiplexed information from said first terminal units through said branch exchange means and the second multiplexed information signals from said signal separation means, and for mixing the first and second multiplexed information signals to supply a composite signal to said first and second terminal units.

2. The system according to claim 1, further comprising:
   first signal transfer line means, connected between said first and second terminal units and said branch exchange means, for transmitting the first and second multiplexed information signals from said first and second terminal units commonly to said branch exchange means in accordacne with predetermined multiplexing technique; and
   second signal transfer line means, connected between said first and second terminal units and said mixer means, for transmitting the first and second multiplexed information signal from said mixer means commonly to said first and second terminal units.

3. The system according to claim 2, wherein said signal separation means is connected between said first and second signal transfer line means, while said mixer means is connected to said second signal transfer line means, said branch exchange means and said signal separation means so as to receive the first and second multiplexed information signals respectively from said branch exchange means and said signal separation means, said second signal transfer line means supplying the composite signal to said first and second terminal units, whereby said first and second signal transfer line means are independent of each other with respect to signal multiplex transmission, and said first and second signal transfer line means can transmit multiplexed information signals in accordance with identical preset conditions with respect to signal multiplex transmission.

4. The system according to claim 3, wherein said first and second signal transfer line means transmit information signals to said branch exchange means and said terminal units in accordance with frequency division multiplexing.

5. The system according to claim 3, wherein said first and second signal transfer line means transmit information signals to said branch exchange means and said plurality of terminal units in accordance with time division multiplexing.

6. The system according to claim 4, further comprising modem means, connected between said first and second signal transfer line means and each of said first terminal units, for modulating said first information signals supplied from each said first terminal units so as to supply a frequency-modulated information signal to said first signal transfer line means and for modulating a frequency-modulated information signal supplied from said mixer means through said second signal transfer line means in accordance with a frequency division transmission scheme.

7. The system according to claim 5, further comprising codec means, connected between said first and second signal transfer line means and said first terminal units, for coding one of said information signals from said first terminal units so as to each of said supply coded information signal to said first signal transfer line means and for decoding a coded information signal supplied in accordance with a time division transmission scheme from said mixer means through said second signal transfer means.

8. The system according to claim 6, further comprising amplifier means, connected between said signal separation means and said mixer means, for receiving and amplifying the second multiplexed information signal supplied from said signal separation means and for supplying an amplified signal to said mixer means.

9. The system according to claim 7, further comprising amplifier means, connected between said signal separation means and said mixer means, for receiving and amplifying the second multiplexed information signal supplied from said signal separation means and for supplying an amplified signal to said mixer means.

10. The system according to claim 6, wherein said modem means includes a plurality of modem units respectively corresponding to said terminal units, each modem unit having a modulator section and a demodulator section.

11. The system according to claim 10, wherein said modem units have different modulation/demodulation frequencies which are included in preselected frequency bands.

12. The system according to claim 11, wherein said modulator section of said each modem unit modulates a signal from a corresponding terminal unit among said predetermined terminal units by using the same frequency as the demodulation frequency assigned to said demodulator section.

13. The system according to claim 12, wherein said signal separation means comprises separation filter means for extracting at least one frequency-division multiplexed information signal having a molulation frequency included in the preselected frequency bands from information signals supplied thereto, and for supplying the frequency-division multiplexed information signal to said branch exchange means.

14. The system according to claim 7, wherein said codec means includes a plurality of codec units respectively corresponding to said predetermined terminal units, each codec unit having a coder section and a decoder section.

15. The system according to claim 14, wherein said codec units respectively have coding/decoding time slots which are different from each other and included in a preselected time range.

16. The system according to claim 14, wherein said coder section of said each codec unit codes an information signal from a corresponding terminal unit among said first terminal unit among said first terminal units at a time slot which is the same as a decoding time slot assigned to said decoder section.

17. The system according to claim 14, wherein said signal separation means comprises separation filter means for extracting at least one time-division multiplexed information signal having one of coding time slots included in the predetermined time range from time-division multiplexed information signals supplied thereto, and for supplying the time-division multiplexed information signal to said branch exchange means.

18. The system according to claim 12, wherein said first and second signal transfer line means include a plurality of pairs of signal transmission and reception lines.

19. The system according to claim 16, wherein said first and second signal transfer line means include a plurality of pairs of signal transmission and reception lines, the respective pairs being parallel to each other.

20. The system according to claim 18, wherein said separation filter means includes a plurality of separation filters respectively connected to said plurality of pairs of signal transmission and reception lines.

21. The system according to claim 20, wherein said mixer means includes a plurality of mixers respectively connected to the plurality of pairs of data transmission and reception lines.

22. The system according to claim 21, further comprising single amplifier means, connected between said plurality of separation filters and said plurality of mixers, for simultaneously receiving and amplifying the second multiplexed data from said separation filters and supplying amplified data to said plurality of mixers, respectively.

23. The system according to claim 19, wherein said separation filter means includes a plurality of separation filters respectively connected to said plurality of pairs of signal transmission and reception lines.

24. The system according to claim 23, wherein said mixer means includes a plurality of mixers respectively connected to said plurality of pairs of data transmission and reception lines.

25. The system according to claim 24, further comprising single amplifier means, connected between said plurality of separation filters and said plurality of mixers, for simultaneously receiving and amplifying the second multiplexed data supplied from said separation filters and supplying amplified data to said plurality of mixers, respectively.

* * * * *